Figure 1:
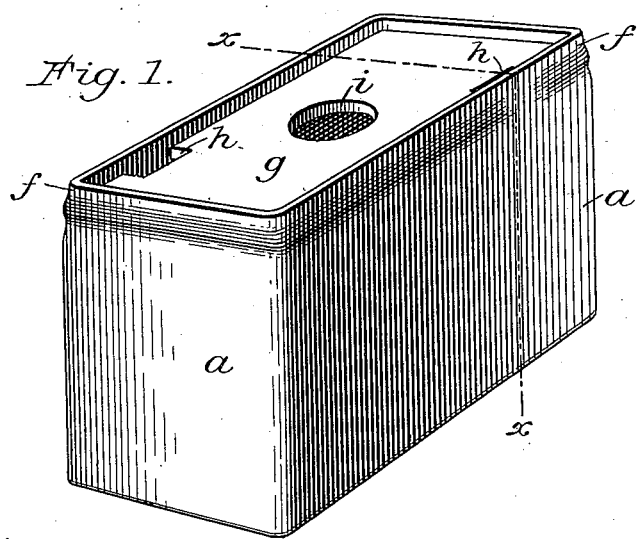

No. 646,325. Patented Mar. 27, 1900.
E. A. SPERRY.
BATTERY JAR OR RECEPTACLE.
(Application filed Apr. 22, 1899.)

(No Model.)

Attest:
Eugene Dun
Aubert M Rich

Inventor:
Elmer A. Sperry
By Buckingham & Ewart
Attorneys.

THE NORRIS PETERS CO., PHOTO-LITHO., WASHINGTON, D. C.

UNITED STATES PATENT OFFICE.

ELMER A. SPERRY, OF CLEVELAND, OHIO.

BATTERY JAR OR RECEPTACLE.

SPECIFICATION forming part of Letters Patent No. 646,325, dated March 27, 1900.

Application filed April 22, 1899. Serial No. 714,054. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Battery Jars or Receptacles, of which the following is a specification.

My invention relates to jars or receptacles for battery-cells, and, while it has been devised more especially for use in connection with secondary or storage batteries to be carried by electrically-propelled vehicles, it is applicable to any form of battery in which a cover is employed for the individual jars or in which supports are provided for the plates or members of each cell.

As is well known, storage batteries are required to be specially sealed to prevent evaporation or leakage of the fluid element, and this sealing is rendered all the more important where the battery is to be subjected to jolting and jarring incident to use upon motor or other vehicles. The jars now in use are for the most part made of hard rubber provided with interior ledges or flanges for supporting the battery plates or members. The unyielding support afforded by the hard rubber, together with the jolting and jarring of the vehicle, besides causing objectionable vibration of the plates frequently results in a fracture of the jar, which is usually made quite thin and brittle.

The main objects sought by me are to obviate the necessity for specially sealing the joint between the cover and jar and to afford a yielding or cushioned bearing or support for the plates or members of the battery. I accomplish both objects by forming the jar of vulcanizable material having integral portions of different degrees of hardness, and by "integral portions" I mean one entire structure as distinguished from a structure built up of separate parts.

I form the body portions of the jar—i. e., the bottom, walls, and main portion of the interior plate-supports—of a vulcanizable compound of such a nature as to become hard under the action of heat and the crowning portions—i. e., the rim or upper portion of the walls and the upper portion or bearing-surface of the plate-supports—of a material or compound which remains soft and elastic under the same conditions which harden the body portions, the two compounds being inserted in proper position in the mold and vulcanized, as will be readily understood. The elastic rim formed around the upper portion or opening of the jar admits of the insertion therein of a cover larger in area than the normal area of the opening, and the elastic rim being thus stretched around the edges of the cover holds the latter in place and forms a practically air-tight joint. It will be obvious that so far as this feature of my invention is concerned the same results may be attained by forming the jar and elastic rim separately and uniting them in any suitable manner, and while a jar thus made will involve no departure from this feature of my invention I prefer to employ vulcanized material for both rim and jar, uniting the hard and soft compounds by vulcanization.

After a detailed description of a jar embodying my invention the features deemed novel will be duly specified in the claims hereunto annexed.

Figure 2:
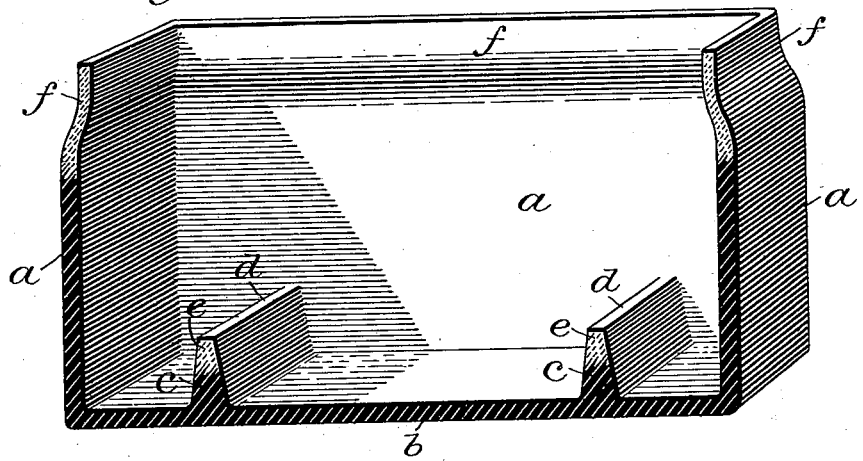
Figure 3:
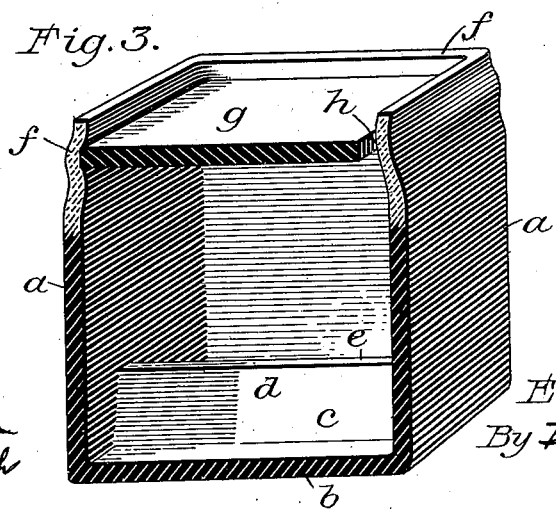

Referring to the drawings, Figure 1 is a perspective view of a jar and cover embodying my invention. Fig. 2 is a vertical longitudinal sectional view of the same with cover removed; and Fig. 3 is a cross-sectional view of the same on line *x x*, Fig. 1.

While I have illustrated a jar of rectangular form having two plate-supporting flanges extending across the bottom from side to side, it is to be understood that both the form of jar and the arrangement and form of the interior supports may be widely varied to suit the requirements of the particular battery or the use to which the battery is to be put without departure from my invention.

The walls *a*, bottom *b*, and main portion *c* of the plate-supports *d* are composed of hard vulcanizable compound, while the bearing-surfaces or upper portions *e* of the plate-supports *d* and the rim *f*, extending around the upper portion or opening of the jar, are composed of resilient or elastic material, forming a cushion-seat for the battery-plates at the bearing-surface of the plate-supports and an elastic rim around the opening of the jar, into which a cover *g* is inserted, which is large enough to distend the rim sufficiently to hold the cover in place and form a practically air-tight joint between cover and rim. The opening formed by the elastic rim *f* is made somewhat smaller than the cross-sectional area of the body of the jar, so that the closed jar will present a practically-flush exterior, as illustrated in Fig. 1. The cover *g* is provided with notches *h h* for affording spaces for the terminals of the battery, and in the center of the cover is the usual opening *i* for inspecting and refilling the cell. This opening *i* is of course normally closed, and the cover should be tightly fitted around the battery-terminals. The elastic rim will tightly hug the edges of the cover, as well as the outside edges or surfaces of the battery-terminals, and form a practically air-tight joint and also acts as a valve for the escape of gases, and no vent is required for this purpose. When gases are generated within the cell to cause sufficient pressure, they will enlarge or distend the elastic rim, and thus escape into the open air.

In the manufacture of a jar embodying all the features of my invention the compounds forming the elastic and non-elastic portions are placed in the mold before vulcanization, and while I prefer to thus make a jar having the elastic-rim feature only it is obvious that the jar and rim may be separately formed of quite different materials and united in any suitable manner.

Having thus described my invention, what I claim as new, and desire to secure by Letters Patent, is—

1. As an article of manufacture, a battery jar or receptacle having body portions and crowning portions composed of vulcanized material of different composition, that composing the body portions being hard or practically non-elastic, and that composing the crowning portions being soft and pliable, substantially as described.

2. As an article of manufacture, a battery-jar or similar receptacle composed of vulcanized material, having hard or practically non-elastic walls and an elastic rim integrally united, substantially as described.

3. As a new article of manufacture, a battery-jar or similar receptacle composed wholly of vulcanized material, having hard or practically non-elastic walls and integral elastic or yielding interior projections or flanges, substantially as described.

4. The combination with a battery-jar or similar receptacle composed of vulcanized material, having hard or practically non-elastic walls and an elastic rim or opening forming an integral continuation of said walls, of a cover inserted within said rim or opening of a larger area than the normal area of said opening, substantially as described.

5. The combination of a battery-jar or similar receptacle composed of vulcanized material, having hard or practically non-elastic walls and an elastic rim or opening forming an integral continuation of said walls smaller in area than the sectional area of the jar, and a cover inserted within said opening larger than the normal area thereof, substantially as described.

6. A support for battery-plates consisting of a plurality of supporting projections connected together and composed of vulcanized material of different compositions, the crowning portions thereof being soft or yielding and the body portions hard or practically non-elastic, substantially as described.

7. A support for battery-plates consisting of a structure composed wholly of vulcanized material, having a plurality of supporting projections, the crowning portions of which are soft or yielding and the body portions hard or practically non-elastic, substantially as described.

ELMER A. SPERRY

Witnesses:
EUGENE DUER,
HERBERT M. RICH.